United States Patent [19]

Paolino

[11] 4,224,728
[45] Sep. 30, 1980

[54] METHOD OF MAKING AN ADJUSTABLE FINGER RING

[76] Inventor: Roland Paolino, 14 Riverview Dr., N. Providence, R.I. 02904

[21] Appl. No.: 952,548

[22] Filed: Oct. 16, 1978

[51] Int. Cl.³ .................. B23D 15/00; A44C 9/02
[52] U.S. Cl. .................. 29/160.6; 63/15.45
[58] Field of Search .................. 63/3, 11, 15.45, 15.5, 63/15.65; 29/160.6

[56] References Cited

U.S. PATENT DOCUMENTS

| 168,855 | 10/1875 | Thomson | 63/11 |
| 1,169,735 | 1/1916 | Salt et al. | 63/11 X |
| 1,434,981 | 11/1922 | Ballard | 63/15.5 |
| 3,683,642 | 8/1972 | Lutrario | 63/15.45 |

FOREIGN PATENT DOCUMENTS 472704  8/1914  France .................. 63/15.65

Primary Examiner—F. Barry Shay
Attorney, Agent, or Firm—Salter & Michaelson

[57] ABSTRACT

An adjustable shank finger ring having an elongated outwardly ribbed shank portion that is formed in a circular configuration, one end of the shank portion having a barrel portion integrally joined thereto, the barrel portion being rolled outwardly to a tubular configuration and receiving the free end of the shank portion in adjustable relation therein to provide for simple adjustment of the size of the shank portion for accommodation on the finger of the user.

1 Claim, 4 Drawing Figures

METHOD OF MAKING AN ADJUSTABLE FINGER RING

BACKGROUND OF THE INVENTION

The present invention relates to an adjustable shank ring and to a method of manufacture thereof, wherein the shank portion of the ring and the portion for receiving the ring ornament are formed in a one-piece construction.

Adjustable shank finger rings are well known and have taken various forms in the constructional arrangement thereof. Such prior known adjustable shank finger rings are exemplified by the constructions illustrated in the U.S. Pats. No. to SALT et al., U.S. Pat. No. 1,169,735; LOCHNER, U.S. Pat. No. 242,946; THOMSON, U.S. Pat. No. 168,855; HENRICH, U.S. Pat. No. 274,193; BONNIOL, U.S. Pat. No. 251,170; DAVIDSON, U.S. Pat. No. 1,109,403; and LUTRARIO, U.S. Pat. No. 3,683,642. All of the aforesaid U.S. patents show some form of an adjustable shank finger ring and for the most part illustrate the concept of concealing the disconnected shank end portion from external view beneath the ring ornament setting. Although the prior known adjustable finger rings accomplished the purpose intended, the usual construction of such rings included several parts which required multiple steps in the manufacture thereof, which necessarily increased the cost of the completed ring assembly.

SUMMARY OF THE INVENTION

The present invention which relates to an adjustable shank finger comprises an elongated shank portion that is formed in a circular configuration, one end of the shank portion having a barrel portion integrally joined thereto in a tubular configuration. The lateral dimension of the barrel portion is substantially greater than the lateral dimension of the shank portion, the barrel portion being rolled so that the lateral edges thereof abut to define an open-ended tube. The free end of the shank portion as formed on the circular configuration thereof, extends within the barrel portion in adjustable relation in the finished form of the ring to provide for adjustment of the size of the shank portion. Thus, the free end of the shank portion is moved with respect to the barrel portion interiorly thereof in accordance with the size of the user's finger. An ornament is secured to the uppermost end of the barrel portion and cooperates therewith to impart an ornamental appearance to the complete assembly.

Accordingly, it is an object of the present invention to provide an adjustable shank finger ring having a shank portion to which a barrel portion is integrally joined, the free end of the shank portion extending into the barrel portion in adjustable relation therein.

Another object is to provide a method of making an adjustable shank finger ring, wherein a single piece of metal is cut to define a shank portion and an integral barrel portion, the shank and barrel portions being shaped to provide for insertion of the free end of the shank portion within the barrel portion in adjustable relation.

Other objects, features and advantages of the invention shall become apparent as the description thereof proceeds when considered in connection with the accompanying illustrative drawings.

DESCRIPTION OF THE DRAWING

In the drawings which illustrate the best mode presently contemplated for carrying out the present invention.

DESCRIPTION OF THE INVENTION

Figure 1:
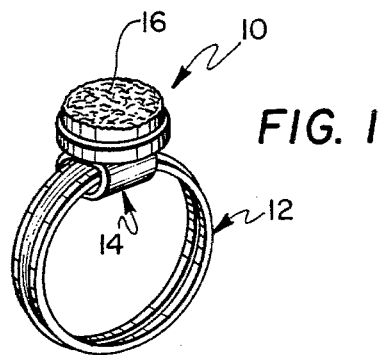
FIG. 1 is a perspective view of the adjustable shank finger ring embodied in the present invention.

Referring now to the drawing and particularly to FIG. 1, the adjustable shank finger ring embodied in the present invention is illustrated and is generally indicated at 10. The finger ring 10 includes a shank portion generally indicated at 12, a tubular barrel portion generally indicated at 14 and an ornament 16 that is mounted on the barrel portion 14, as will be described hereinafter.

Figure 2:
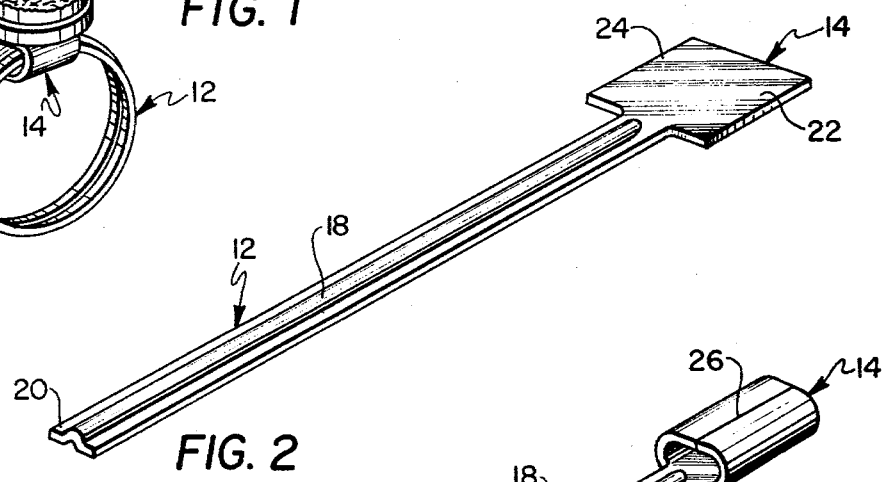
FIG. 2 is a perspective view of a metal blank after it has been die cut and prior to the formation of the shank and barrel portions of the ring.
Figure 3:
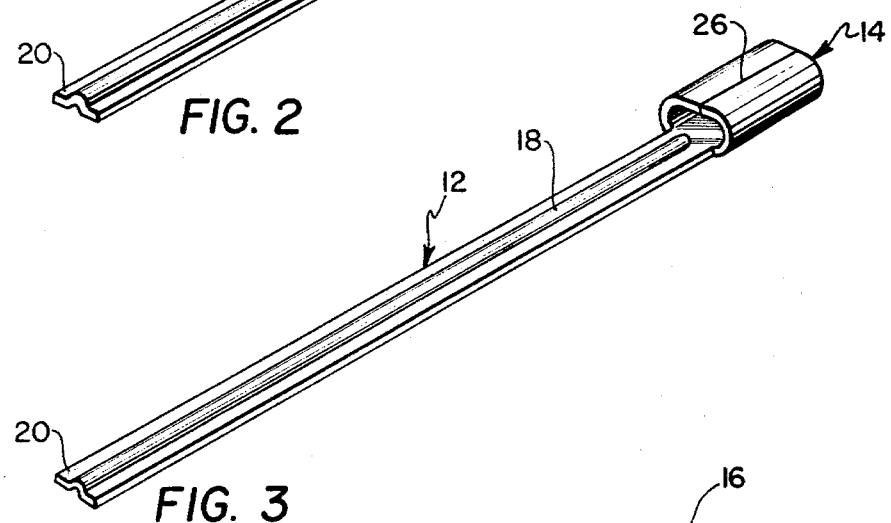
FIG. 3 is a view similar to FIG. 2 and showing the formation of the barrel portion after it has been rolled to a tubular configuration.

Referring to FIGS. 2 and 3, the shank and barrel portions are illustrated in the various states of working thereof to the finished form of the finger ring. The shank portion 12 and the barrel portion 14 are formed of a single piece of metallic material and, although not shown, the shank and barrel portions are die cut to the configuration as illustrated in FIG. 2. In this configuration, the shank portion is worked to include an elongated stiffening rib 18 along the length thereof so as to provide strength to the shank portion when it is formed in the circular configuration of use. The shank portion 12 is formed with a free end 20 and is integrally joined at the other end thereof to the barrel portion 14. As shown in FIG. 2, the longitudinal dimension of the shank portion 12 is considerably greater than that of the barrel portion 14; however, the barrel portion 14 has a lateral dimension that is somewhat greater than the lateral dimension of the shank portion 12.

Following the die cutting operation that forms the shank portion 12 and the barrel portion 14 in the configuration as shown, and further after the formation of the stiffening rib 18, the barrel portion is rolled to the shape as illustrated in FIG. 3, wherein lateral portions 22 and 24 of the barrel portion are moved into abutting relation along edge line 26 that substantially overlies the extension of the longitudinal axis of the shank portion 12. With the edges of the lateral portions 22 and 24 of the barrel portion 14 abutting along the line 26 as illustrated in FIG. 3, the barrel portion is formed in a tubular configuration for the purpose as will be described hereinafter.

Figure 4:
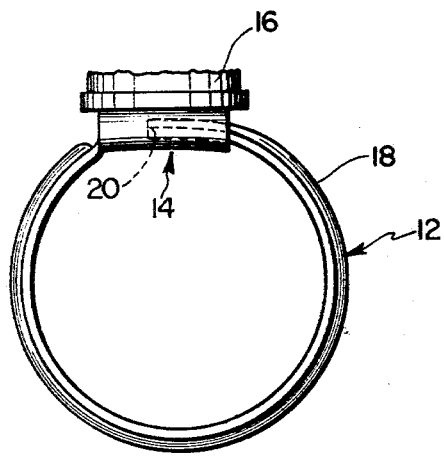
FIG. 4 is an elevational view of the completed finger ring after the shank portion has been formed in a circular configuration, the free end of the shank portion being received within the tubular barrel portion.

Following the formation of the barrel portion 14 into the tubular configuration, the shank portion 12 is thereafter rolled to a circular configuration as illustrated in FIGS. 1 and 4, the free end 20 of the shank portion 12 extending inwardly of the tubular barrel portion 14. Thereafter, the ornament 16 is applied to the upper surfaces of the barrel portion 14 and overlies the abutting edge line 26 to conceal the edge line 26 from external view. It is understood that any form of an ornament 16 may be applied to the barrel portion 14 as indicated, the form of the ornament 16 as shown being only a representation of an ornament that will be used in the final assembly.

In use of the adjustable shank finger ring 10, the user will normally flex the shank 12, moving the free end 20 thereof relative to the tubular barrel portion 14 but within the confines thereof so as to size the shank portion as required. Since the free end 20 of the shank portion is concealed within the barrel portion 14, the ring has the appearance of a fixed shank ring, but has the advantage of being adjustable to the size of the user. It is understood that the shank portion and barrel portion will be plated in any suitable manner and in accordance with accepted practices in the trade.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A method of forming an adjustable shank finger ring comprising the steps of die cutting an integral elongated shank portion and barrel portion from a single piece of metallic material, wherein the shank portion has a longitudinal dimension substantially greater than that of said barrel portion and the barrel portion has a lateral dimension substantially greater than that of said shank portion, forming a central longitudinally extending rib in said shank portion that extends along one side of said shank portion substantially the length thereof, rolling over the lateral edges of said barrel portion to define a tube, wherein said lateral edges abut along a line that overlies the side of said barrel portion corresponding to said one side and that is substantially coincident with an extension of the longitudinal axis of said shank portion, forming said shank portion in a circular configuration with said one side facing outwardly thereof and inserting the end thereof that is located opposite to the tubular barrel portion internally thereof, and securing an ornamental member on said barrel portion in overlying relation with respect to the junction of the abutting lateral edges thereof.

* * * * *